United States Patent
Tidhar

(10) Patent No.: US 10,040,571 B2
(45) Date of Patent: Aug. 7, 2018

(54) SYSTEMS FOR AND METHODS OF PROVIDING INDICATORS USEFUL FOR PILOTING AN AIRCRAFT

(71) Applicant: Elta Systems Ltd., Ashdod (IL)

(72) Inventor: Nir Tidhar, Holon (IL)

(73) Assignee: Elta Systems Ltd., Ashdod (IL)

( * ) Notice: Subject to any disclaimer, the term of this patent is extended or adjusted under 35 U.S.C. 154(b) by 138 days.

(21) Appl. No.: 14/930,141

(22) Filed: Nov. 2, 2015

(65) Prior Publication Data

US 2016/0122035 A1 May 5, 2016

(30) Foreign Application Priority Data

Nov. 5, 2014 (IL) ............................. 235502

(51) Int. Cl.
| | |
|---|---|
| *B64D 45/00* | (2006.01) |
| *G01S 3/04* | (2006.01) |
| *G01S 3/14* | (2006.01) |
| *G05D 1/00* | (2006.01) |
| *G01C 23/00* | (2006.01) |
| *H04B 7/185* | (2006.01) |
| *B64D 43/00* | (2006.01) |

(52) U.S. Cl.
CPC ............ *B64D 45/00* (2013.01); *G01C 23/00* (2013.01); *G01S 3/046* (2013.01); *G01S 3/14* (2013.01); *G05D 1/0094* (2013.01); *B64D 43/00* (2013.01); *H04B 7/18506* (2013.01)

(58) Field of Classification Search
CPC B64D 45/00; B64D 43/00; G01S 3/14; G01S 3/16; G01S 3/38; G01S 3/046; G01S 3/00; G05D 1/0094; G05D 1/0808; G05D 1/0883; G05D 1/12; H01Q 1/28; H04B 7/18506; B64C 2201/141; B64C 2201/146; B64C 2201/122; B64C 39/024
See application file for complete search history.

(56) References Cited

U.S. PATENT DOCUMENTS

| | | | |
|---|---|---|---|
| 4,875,646 A | 10/1989 | Browning et al. | |
| 5,269,483 A | * 12/1993 | Flament | ................ B64G 1/285 244/164 |
| 6,377,875 B1 | 4/2002 | Schwaerzler | |

(Continued)

FOREIGN PATENT DOCUMENTS

| | | |
|---|---|---|
| CN | 101938287 A | 1/2011 |
| EP | 2498055 A2 | 9/2012 |
| KR | 101249825 B1 | 4/2013 |

*Primary Examiner* — Spencer D Patton
(74) *Attorney, Agent, or Firm* — Mintz Levin Cohn Ferris Glovsky and Popeo, P.C.; Steven M. Jensen

(57) ABSTRACT

The present disclosure provides a computer implemented method of providing an indicator useful for piloting an aircraft. The aircraft comprises an antenna configured to communicate with a transceiver. The method comprises: obtaining an antenna envelope characterizing directions relative to the aircraft for which a directive gain of the antenna exceeds a predetermined threshold; determining a direction of the transceiver relative to the aircraft; calculating a maneuvering range of the aircraft by comparing the antenna envelope and the transceiver direction, wherein the maneuvering range is indicative of eligible orientations of the aircraft for maintaining the transceiver within the antenna envelope; and outputting data indicative of the maneuvering range.

20 Claims, 4 Drawing Sheets

(56) References Cited

U.S. PATENT DOCUMENTS

| | | |
|---|---|---|
| 7,095,376 B1 | 8/2006 | Timothy et al. |
| 2005/0103943 A1* | 5/2005 | Tanielian ............ B64C 39/024 244/190 |
| 2014/0218239 A1 | 8/2014 | Sharawi et al. |

* cited by examiner

SYSTEMS FOR AND METHODS OF PROVIDING INDICATORS USEFUL FOR PILOTING AN AIRCRAFT

CROSS-REFERENCE TO RELATED APPLICATION(S)

This application claims under 35 U.S.C. § 119(a) the benefit of Israel Application No. 235502, filed Nov. 5, 2014, the entire contents of which are incorporated by reference herein.

TECHNOLOGICAL FIELD

The present disclosure relates generally to the field of aircraft. More particularly, the present disclosure relates to systems for and methods of providing indicators useful for piloting an aircraft. A secondary title for the present disclosure is N.I.R (Nearest Intercept Roll) display and algorithm.

BACKGROUND

Aircraft are generally provided with multiple avionics systems which require one or more antennas to be mounted on the aircraft. Antennas have specific requirements of size, weight, reliability and maintainability. Particularly, size and weight requirements restrict locations where the antenna can be installed because poor antenna placement can degrade the flying qualities of an aircraft and impact the performance of the avionic system. Furthermore, the antenna has reliability requirements and should be capable of withstanding prolonged exposure to the environment. Maintenance requirements are generally expressed in that the antenna should require minimum repair time if a failure occur. Additionally, antennas have limitations regarding to the directions in which radiation intensity is radiated. The avionics systems using antennas provide for example functions such as communication, navigation and radar functions. Communication and navigation functions are typically accomplished by UHF/VHF radios, LOS (Line of sight) communication systems, SATCOM (Satellite communication), Tactical air navigation equipments (TACAN), Instrument Landing Systems (ILS), Global Positioning Systems (GPS) and radar altimeters.

These avionics systems may be of crucial importance for piloting the aircraft. For example, when the aircraft is an unmanned air vehicle (UAV), loss of communication with the UAV may trigger special procedures to be implemented which could result in destruction of the UAV.

GENERAL DESCRIPTION

The Applicant has found that maintaining communication between an antenna mounted on an aircraft and a remote transceiver can be facilitated by providing the pilot in real time with an indicator indicative of a relative position of the transceiver with respect to an antenna radiation capability.

Therefore, the present disclosure provides a computer implemented method of providing an indicator useful for piloting an aircraft. The aircraft comprises an antenna configured to communicate with a transceiver. The method comprises: (a) obtaining an antenna envelope characterizing directions relative to the aircraft for which a directive gain of the antenna exceeds a predetermined threshold; (b) determining a direction of the transceiver relative to the aircraft; (c) calculating a maneuvering range of the aircraft by comparing the antenna envelope and the transceiver direction, wherein the maneuvering range is indicative of eligible orientations of the aircraft for maintaining the transceiver within the antenna envelope; and (d) outputting data indicative of the maneuvering range.

In some embodiments, when the transceiver direction is out of the antenna envelope, the maneuvering range is empty. In some embodiments, the method may include when the transceiver direction is within the antenna envelope, calculating the maneuvering range and outputting the maneuvering range i.e. the maneuvering range may be calculated upon determining that the transceiver direction is within the antenna envelope.

In some embodiments, determining the direction of the transceiver comprises: retrieving positional information of the aircraft and of the transceiver; and determining a bearing and elevation of the transceiver with respect to the aircraft using said positional information.

In some embodiments, the transceiver is comprised in at least any one of: a ground station, a satellite and another aircraft.

In some embodiments, the predetermined threshold is variable with respect to a direction relative to the aircraft.

In some embodiments, the steps (a)-(d) are performed continuously in real-time.

In some embodiments, the outputting comprises displaying of the data indicative of the maneuvering range on a display unit.

In some embodiments, the aircraft is an unmanned aircraft vehicle and the displaying is performed at a control station remote from the aircraft.

In some embodiments, the aircraft is a manned aircraft vehicle and the displaying is performed in a pilot cabin.

In some embodiments, the data indicative of the maneuvering range comprises roll and/or pitch variation maximum values to maintain the transceiver within the antenna envelope.

In some embodiments, the roll and/or pitch variation maximum values include a tolerance margin.

In some embodiments, the data indicative of the maneuvering range is provided using a color code system.

In some embodiments, the method further comprises: calculating a recovery range of the aircraft, the recovery range defining potential orientations of the aircraft for returning the transceiver within the antenna envelope; and outputting data indicative of the recovery range.

In some embodiments, when the transceiver direction is in the antenna envelope, the recovery range is empty. In some embodiments, the method may include when the transceiver direction is out of the antenna envelope, calculating the recovery range and outputting the recovery range i.e. the recovery range may be calculated upon determining that the transceiver direction is out of the antenna envelope.

In some embodiments, the data indicative of the recovery range comprises roll and/or pitch variation minimum values to return the transceiver within the antenna envelope.

In some embodiments, obtaining the antenna envelope is performed using data indicative of a reference antenna radiation pattern.

In some embodiments, the reference antenna radiation pattern involves a scanning capability of the antenna and/or interferences between the antenna and the aircraft structure.

In some embodiments, obtaining the antenna envelope is performed by accessing prestored data indicative of directions relative to the aircraft for which the reference antenna radiation pattern exceeds a default threshold.

In some embodiments, obtaining the antenna envelope comprises updating the predetermined threshold and determining the antenna envelope using the updated predetermined threshold and the reference antenna radiation pattern.

In some embodiments, obtaining the antenna envelope comprises detecting obstruction from a scene relief using topographical data.

In some embodiments, the data indicative of the maneuvering range and/or of the recovery range are output to a pilot of the aircraft or to an autopilot system of the aircraft.

The present disclosure also provides a computer program comprising software code adapted to perform the method previously described.

The present disclosure additionally provides a system for use in providing an indicator useful for piloting an aircraft, the aircraft including an antenna configured to receive/transmit a signal to/from a transceiver (i.e. to communicate with the transceiver), the system comprising: memory; a positional module configured to obtain positional data of the aircraft and of the transceiver; a processing module communicatively coupled to the memory and to the positional module, wherein the memory includes instructions for causing the processing unit to: obtain an antenna envelope characterizing directions relative to the aircraft for which the directive gain of the antenna exceeds a predetermined threshold; determine a direction of the transceiver relative to the aircraft; calculate a maneuvering range of the aircraft by comparing the antenna envelope and the transceiver direction, wherein the maneuvering range is indicative of eligible orientations of the aircraft maintaining the transceiver within the antenna envelope; and output data indicative of the maneuvering range.

In some embodiments, the system further comprises an output unit configured to output the data indicative of the maneuvering range to a pilot of the aircraft.

In some embodiments, the output unit is a display unit configured to display the data indicative of the maneuvering range.

In some embodiments, the aircraft is a manned aircraft and the display unit is arranged within an on-board pilot cabin.

In some embodiments, the aircraft is an unmanned aircraft and the display unit is arranged in a remote control station.

In some embodiments, the memory further includes instructions for causing the processing unit to: calculate a recovery range of the aircraft, the recovery range defining potential orientations of the aircraft for returning the transceiver within the antenna envelope; and output data indicative of the recovery range.

The present disclosure additionally provides a computer implemented method of providing an indicator useful for piloting an aircraft, the aircraft including an antenna configured to receive/transmit a signal to/from a transceiver, the method comprising: obtaining an antenna envelope defining directions relative to the aircraft for which the directive gain of the antenna exceeds a predetermined threshold; determining a direction of the transceiver relative to the aircraft; calculating a recovery range of the aircraft by comparing the antenna envelope and the transceiver direction, the recovery range defining eligible orientations of the aircraft for returning the transceiver within the antenna envelope; and outputting data indicative of the recovery range.

The present disclosure additionally provides a system for use in providing an indicator useful for piloting an aircraft, the aircraft including an antenna configured to receive/transmit a signal to/from a transceiver, the system comprising: memory; a positional module configured to obtain positional data of the aircraft and of the transceiver; a processing module communicatively coupled to the memory and to the positional module, wherein the memory includes instructions for causing the processing unit to: obtain an antenna envelope characterizing directions relative to the aircraft for which the directive gain of the antenna exceeds a predetermined threshold; determine a direction of the transceiver relative to the aircraft; calculate a recovery range of the aircraft by comparing the antenna envelope and the transceiver direction, the recovery range being indicative of eligible orientations of the aircraft for returning the transceiver within the antenna envelope; and output data indicative of the recovery range.

The present disclosure additionally provides a computer implemented method of providing an indicator useful for piloting a drone, the drone comprising an antenna configured to receive a signal from a satellite, the method comprising: obtaining an antenna envelope characterizing directions relative to the drone for which a directive gain of the antenna exceeds a predetermined threshold; determining a direction of the satellite relative to the drone; calculating a maneuvering range of the drone by comparing the antenna envelope and the satellite direction, wherein the maneuvering range is indicative of eligible orientations of the drone for maintaining the satellite within the antenna envelope; and outputting data indicative of the maneuvering range to an operator of the drone. It is understood that the term drone may refer to a UAV or to a remote controlled ship or ground vehicle.

Furthermore, it is understood herein that the maneuvering and recovery range are associated to a transceiver so that in case several transceiver are considered, several different maneuvering and/or recovery ranges associated with each transceiver may be determined.

The term transceiver is used herein to refer either to a receiver or a transmitter or to an element configured to both transmit and receive radio signals i.e. to communicate with a remote antenna. Similarly, the antenna is configured to either receive and/or transmit.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
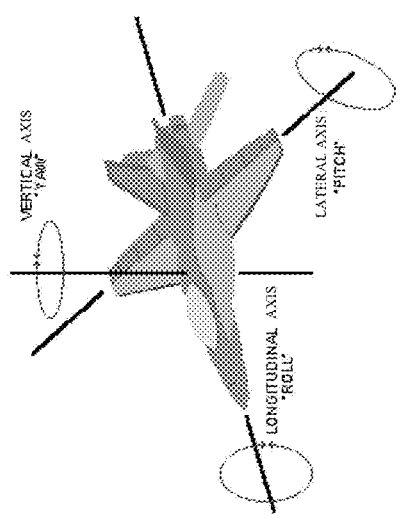
FIG. 1 illustrates the principal axes of an aircraft.

Described herein are some examples of systems and methods useful for providing indicators useful for piloting an aircraft so that reception and/or emission of signals by an on-board antenna to/from a remote transceiver is facilitated.

The presently disclosed systems and methods may enable assisting the pilot of an aircraft or improving an autopilot system of the aircraft.

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrase "for example," "such as", "for instance" and variants thereof describe non-limiting examples of the subject matter.

Reference in the specification to "one example", "some examples", "another example", "other examples, one instance", "some instances", "another instance", "other instances", "one case", "some cases", "another case", "other cases" or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions utilizing terms such as "generating", "determining", "providing", "receiving", "using", "handling", "transmitting", "performing", "analyzing", "or the like, may refer to the action(s) and/or process(es) of any combination of software, hardware and/or firmware. For example, these terms may refer in some cases to the action(s) and/or process(es) of a programmable machine, that manipulates and/or transforms data represented as physical, such as electronic quantities, within the programmable machine's registers and/or memories into other data similarly represented as physical quantities within the programmable machine's memories, registers and/or other such information storage, transmission and/or display element(s).

In the present disclosure, the following terms and their derivatives may be understood in light of the below explanations:

Antenna Radiation Pattern (Directive Gain Pattern)

The term antenna radiation pattern refers to the directional (angular) dependence of the strength of the radio waves from/to the antenna. It may be expressed as a ratio of the radiation intensity in a given direction to the radiation of an isotropic source. Additionally, in the following, the antenna radiation pattern may include the radiation pattern of the antenna as such and also take into account interferences of the aircraft structure on the antenna pattern. Indeed, components such as the fuselage, wings, engines, etc. may affect the antenna radiation pattern depending on the location of the antenna on the aircraft. Additionally, the antenna radiation pattern may also include a scanning capability of the antenna. Indeed, the antenna may be a steerable antenna provided with scanning capability. Scanning capability may be provided mechanically, for example by a steerable platform accommodating the antenna, or electronically, for example by the antenna being a phased array antenna. In the following, the term radiation pattern may refer to the radiation pattern of the antenna including additionally the influence of the positioning of the antenna in the aircraft and/or the scanning capability of the antenna.

Techniques for determining the antenna radiation pattern may be based on numerical techniques of modeling the antenna and the aircraft. For example, software like WIPL-D, SAVANT, PATCH and APATCH may be used to create said models. This approach has the advantage of being efficient and cost effective. Other techniques can also be used like such as flight tests involving mounting the aircraft on a tiltable pedestal and illuminating the aircraft with a radiofrequency field over a wide range of orientations of the aircraft. Other techniques may also use a radiation chamber.

Antenna Envelope

The antenna envelope may define directions relative to the aircraft for which the directive gain of the antenna exceeds a predetermined threshold. In some embodiments, the predetermined threshold may be a default function dependent for example on a direction relative to the aircraft. This may enable giving privilege to some directions in certain applications. In some embodiments, the predetermined threshold may be a value independent of a direction relative to the aircraft. In some embodiments, the threshold may be adjustable over time either manually and/or automatically, for example based on environmental parameters such as weather or a mode of operation of the system. In some embodiments, the antenna envelope may be prestored for a default value of the predetermined threshold. In some embodiments, the antenna envelope may be determined (refined) based on topographic data so as to detect obstruction from a relief structure. The threshold may also be adjusted based for example on the type of task that the antenna supports. In some embodiments, the antenna envelope may be derived from the antenna radiation pattern and the predetermined threshold. In some embodiments, the antenna envelope may be approximated by a cone. This may enable to lower computational requirements.

Orientation/Position/Direction

The orientation (attitude) of the aircraft may be defined using the principal axes of the aircraft—with respect to a reference orientation. The principal axes may define an frame coordinate linked to the aircraft. As illustrated in FIG. 1, the principal axes may include a normal axis (also referred to as a yaw axis, generally defined to be perpendicular to the body of the wings with its origin at the center of gravity and directed towards the bottom of the aircraft), a lateral axis (also referred to as a pitch axis, generally passing through the plane from wingtip to wingtips) and a longitudinal axis (also referred to as a roll axis, generally passing through the plane from nose to tail). These axes may run perpendicularly to each other through the gravity center of the airplane. Directions relative to the aircraft may be defined with reference to the principal axes coordinate frame. The term position may be generally understood as referring to a set of coordinates in a ground reference frame, for example a reference frame centered on the earth center. Furthermore, the term "pilot" is understood as applying at least to either a user of a manned aircraft or to a user/operator of an unmanned aircraft.

Figure 2:
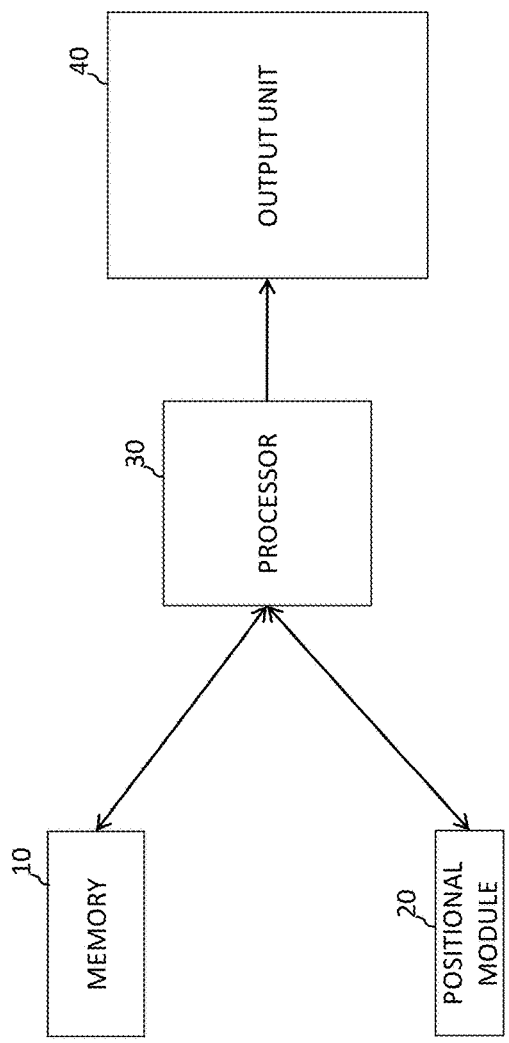
FIG. 2 illustrates a functional diagram of a system according to embodiments of the present disclosure.

FIG. 2 illustrates generally a system for use in providing an indicator useful for piloting an aircraft so that reception and/or emission of a signal from/to a remote transceiver by an antenna of the aircraft is facilitated. The system comprises memory 10, a positional module 20, a processing unit 30 and an output unit 40 being communicatively coupled. As will be understood by the man skilled in the art, the system according to the present disclosure may be implemented in a dedicated electronic unit or may be implemented on a control station of the aircraft. In embodiments related to UAVs, the control station may be a remote control station. In embodiments related to manned aircrafts, the control station may be integrated in the pilot cabin.

The positional module 20 may obtain positional data of the aircraft and of the transceiver. In some embodiments, the positional data may include data indicative of a position of the aircraft, an orientation of the aircraft (i.e. determining 6 degrees of freedom of the aircraft) and a position of the transceiver. In some embodiments, the positional module 20 may be communicatively coupled to a geolocation unit and to an inertial unit. The geolocation unit may be configured to provide in real-time the position of the aircraft. For example, the geolocation unit may be provided with GPS, GNSS, GLO-NASS, Galileo, IRNSS and/or Beidou-2 capabilities to enable locating the aircraft. The inertial unit may be configured to provide in real-time an orientation of the aircraft. For example, the inertial unit may comprise a gyroscope. Further, the positional module may also be configured to obtain in real-time a position of the transceiver. In some embodiments, the transceiver may be within a ground station or a geo-stationary satellite and may not move with respect to the ground reference frame. In these embodiments, the positional data relative to the transceiver may be preset and does not need to be updated.

The memory 10 may include instructions for causing the processing unit 30 to determine an antenna envelope defining directions relative to the aircraft for which the directive gain of the antenna exceeds a predetermined threshold. The memory may store data indicative of the directive gain pattern of the antenna i.e. a database associating directions in the aircraft frame with corresponding antenna gain values in said direction. As explained above, the directive gain pattern of the antenna may account for the interactions between the antenna and the aircraft and/or for scanning capabilities of the antenna. For example, if the original radiation pattern of the antenna (as such when it is not provided with scanning capability) forms a cone of 10 degrees around the yaw axis of the aircraft and the antenna is provided with a scanning capability of 30 degrees, the global radiation pattern of the antenna would be a cone of 40 degrees around the yaw axis of the aircraft.

The predetermined threshold may be a value which may not change over time (a constant over time) or may be a value which may change over time (a variable over time), for example upon input from a user or at predefined time intervals. The predetermined threshold may also be a function of the direction with respect to the aircraft. In some embodiments, a set of proposed values/functions for the predetermined threshold may be stored in the memory and a user of the system may select among said values/functions. Further, the system may be configured for automatically setting a default value/function for the predetermined threshold. For example, the default value may be −3 dB, −5 dB, −10 dB or −15 dB. The system may automatically update the predetermined threshold for example based on environmental parameters such as weather data.

The processing unit 30 may be configured to derive the antenna envelope from the radiation pattern of the antenna and from the predetermined threshold. Furthermore, the processing unit 30 may be configured to determine a direction of the transceiver with respect to the aircraft. The direction of the transceiver with respect to the aircraft may be derived from the positional data obtained by the positional module 20 which is communicatively coupled to the processing unit 30.

Furthermore, the processing unit may be configured to compare the antenna envelope and the transceiver direction and, when the transceiver direction is within the antenna envelope, calculate a maneuvering range of the aircraft. The maneuvering range may define eligible (suitable) orientations of the aircraft which maintain the transceiver within the antenna envelope. In other words, the maneuvering range may define orientations of the aircraft which, considering the current position of the transceiver and aircraft, would not eject the transceiver from the antenna envelope.

The processing unit 30 may be configured to output data indicative of the maneuvering range to a pilot of the aircraft. For example, the processing unit may output data indicative of the maneuvering range to the output unit 40. The output unit 40 may comprise a display screen and/or a speaker. The output of data indicative of the maneuvering range may comprise displaying roll and/or pitch variation maximum values on the display screen. The roll and/or pitch variation maximum values may define variation of roll and/or pitch which would oust the transceiver from the antenna envelope. Therefore, below these maximum values, the variation of pitch and/or roll maintains the transceiver in the antenna envelope and above these maximum values the roll and/or pitch variation lead the transceiver to not being covered by the antenna envelope. The displayed pitch and/or roll maximum values may include a tolerance margin in the scale of half a degree so that reaching the maximum value may not lead to automatic loss of communication with the transceiver.

Furthermore, the data indicative (indicator) of the maneuvering range may be provided using a color code. For example, light color (e.g. green blue) may be used to indicate that the maneuvering range is wide. For example, the maneuvering range may be considered wide when roll and/or pitch variation maximum values exceed a predetermined first value (e.g. 10 degrees or 15 degrees). Warmer colors (e.g. orange, red) may be used to indicate that the maneuvering range is narrow. For example, the maneuvering range may be considered narrow when roll and/or pitch variation maximum values are below a second predetermined value (e.g. 5 degrees or 3 degrees).

Additionally, it is noted that the aircraft may be a manned air vehicle controlled from an inner cabin of the aircraft as well as an unmanned air vehicle controlled from a remote control station which can either be located on the ground or in another air vehicle. The UAV and remote control station may have a communication link to update the remote control station with dynamic information of the UAV and to control the UAV. Therefore, the display screen displaying the indicator of the maneuvering range may respectively be in the pilot cabin or in the remote control station.

Optionally, it is noted that the presently disclosed method may also be implemented in autopilot systems of a UAV or manned aircraft by outputting the maneuvering and/or recovery ranges to the autopilot systems. The autopilot systems may additionally be configured to consider the maneuvering and/or recovery ranges.

The Applicant has found that outputting said indicator to the pilot may assist the pilot in keeping the transceiver within the antenna envelope and therefore avoid disruption of avionics systems relying on reception/transmission of a signal to/from said transceiver. In the context of unmanned air vehicles, providing this indicator in real time may significantly improve control of the pilot on the aircraft. It is understood that the term real time used herein refers to the time interval between the dynamic positional information is input to the N.I.R algorithm and the time the result is output to the pilot/operator (N.I.R display or speaker or autopilot). This time interval is as short as physics or technology can provide.

The processing unit 30 may be configured to compare the antenna envelope and the transceiver direction and, when the transceiver direction is out of the antenna envelope, calculate a recovery range of the aircraft. The recovery range may define potential orientations of the aircraft for returning the transceiver within the antenna envelope. The processing unit 30 may be configured to output an indicator (data indicative) of the recovery range to a pilot of the aircraft. For example, the processing unit may output data indicative of the recovery range to the output unit 40. The output unit 40 may comprise a display screen and/or a speaker. Outputting data indicative of the recovery range to a pilot of the aircraft may comprise providing roll and/or pitch variation minimum values to return the transceiver within the antenna envelope. In other words, the processing unit 30 may determine how the aircraft should be oriented for the transceiver to return within the antenna envelope given the current position of the aircraft and transceiver.

The Applicant has found that providing an indication of the recovery range to the pilot may enable the pilot to better manage handover from one transceiver to another transceiver.

Figure 3:
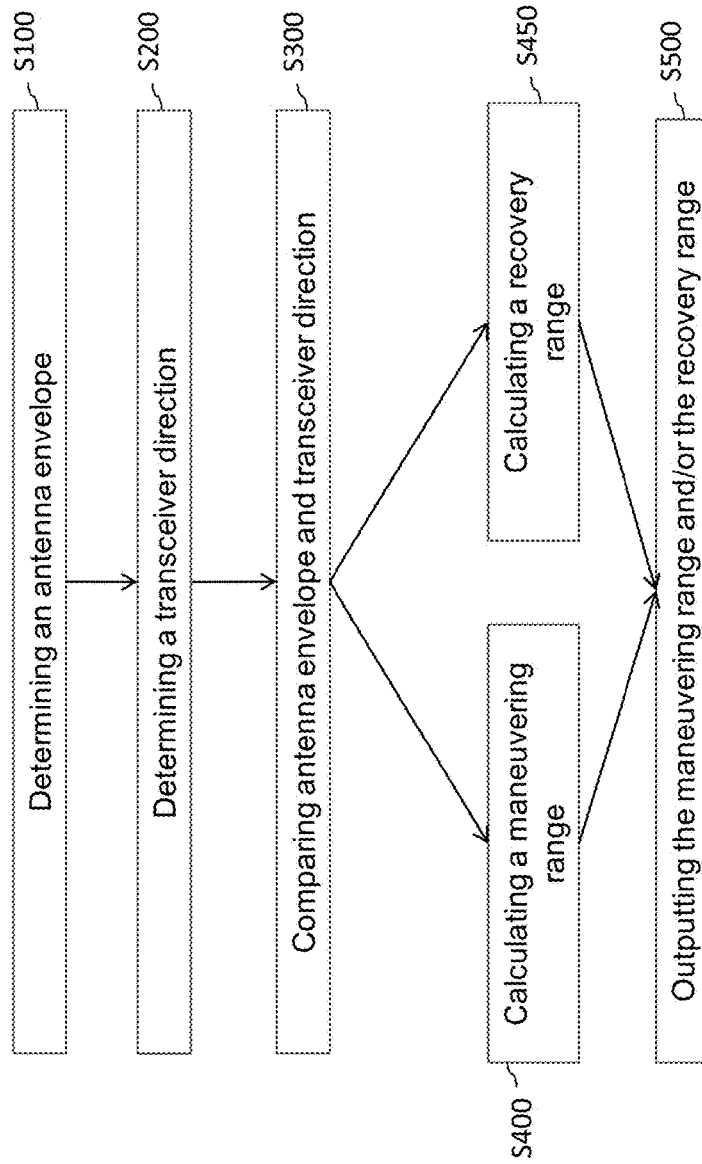
FIG. 3 is a flow chart illustrating schematically steps of a method according to embodiments of the present disclosure.

FIG. 3 illustrates steps of a method of providing an indicator useful for piloting an aircraft so as to maintain reception of a signal from a remote transceiver by an antenna mounted on the aircraft. In particular, the method of FIG. 3 may be implemented on the system of FIG. 2. In a step S100, an antenna envelope may be determined. The antenna envelope may define directions relative to the aircraft for which a directive gain of the antenna exceeds a predetermined threshold. In some embodiments, the antenna envelope may be derived from a directive gain pattern of the antenna and from a predetermined threshold. In some embodiments, the antenna envelope may be preliminarily stored in a memory of a system implementing the method. For example, the predetermined threshold may have a default value. In some embodiments, the antenna envelope may be refined by further processing. For example, the antenna envelope may be refined by taking into account topography around the position of the aircraft to detect any obstruction for example presence of a mountain. In some embodiments, the antenna envelope may be recalculated by input of a new threshold by a user. For example, a user may input a new threshold at the beginning of a flying mission. In some other example, the threshold may vary with time for example due to weather changes. In other words, a default threshold may be manually or automatically adjusted i.e. the method may comprise a step of adjusting the default threshold and a step of determining the antenna envelope based on the adjusted threshold. In a step S200, a transceiver direction relative to the aircraft may be determined. The transceiver direction may be calculated based on positional data of the aircraft and of the transceiver. The positional data may include an orientation and a position of the aircraft and a position of the transceiver. In a step S300, the antenna envelope and the transceiver direction may be compared to determine if the transceiver is within the antenna envelope i.e. if the antenna has a gain higher than the predetermined threshold in the transceiver direction. In a step S400, if the transceiver direction is within the antenna envelope, a maneuvering range is calculated. The maneuvering range may define a range of potential orientation—given the current position of the aircraft—for which the transceiver would stay within the antenna envelope. In a step S450, if the transceiver direction is out of the maneuvering range, a recovery range is calculated. The recovery range may define potential orientations of the aircraft which would return the transceiver into the antenna envelope. In a step S500, indicators indicative of the maneuvering range and/or the recovery range may be output to the pilot of the aircraft. For example, as described above, the indicators may be output visually by displaying said indicators on a display unit.

Figures 4, 5:
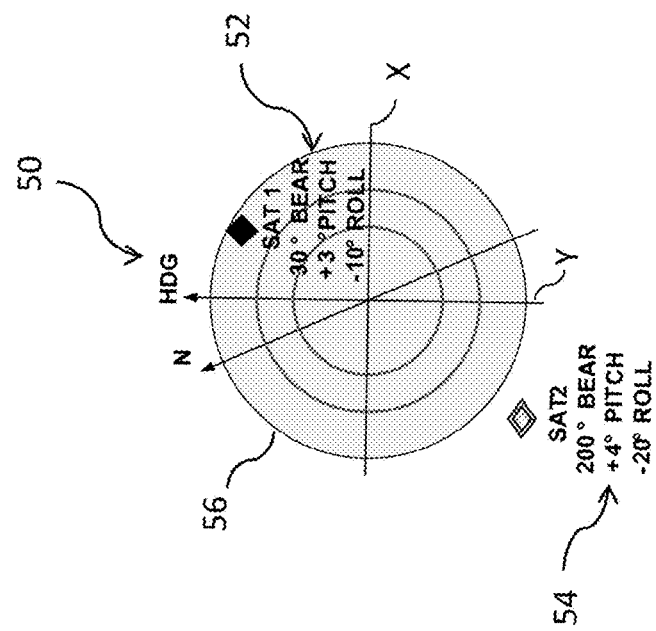
FIG. 4 illustrates an aircraft implementing the system according to embodiments of the present disclosure.
FIG. 5 illustrates a view of a display unit outputting data indicative of a maneuvering and recovery ranges according to embodiments of the present disclosure.

FIG. 4 illustrates schematically an application of the above described method and system on an aircraft 100 for which a first transceiver 200 is within an antenna envelope 150 and a second transceiver 250 falls outside of the antenna envelope 150. In the example, the first and second transceivers are satellites. FIG. 5 illustrates a sample display 50 of the maneuvering and recovery indicators in the situation illustrated on FIG. 4. The display 50 provides a first indicator 52 of the maneuvering range for the first transceiver 200 and a second indicator 54 of the recovery range for the second transceiver 250. As can be seen on FIG. 5, the maneuvering range and the recovery can be expressed by pitch and/or roll values. For the first indicator 52, the pitch and roll values (+3°, −10°) represent maximum pitch and/or roll variation values which can be applied to the aircraft while maintaining the first transceiver 200 within the antenna envelope 150. For the second indicator 54, the pitch and roll values (+4°, −20°) represent minimum pitch and/or roll variation values which can be applied to the aircraft to return the second transceiver 250 within the antenna envelope 150. Additionally, it is noted that the display unit may also display further indications such as a flying direction HDG, the north direction N, a bearing difference between the first and/or second transceiver, and the flying direction. Particularly, it is noted that the outputting may comprise displaying the position of the transceiver(s) projected onto a display plane formed by a pitch axis X and a roll axis Y of the aircraft. The Applicant has found that this particular set up eases the cognitive burden of the pilot and improves the piloting interface. In general, the display 50 may comprise the position of the transceiver(s) as projected on a plane perpendicular to a principal directivity direction of the antenna. Further, the display 50 may comprise a representation of a section 56 of the antenna envelope, for example in a plane perpendicular to the principal directivity direction of the antenna including the transceiver.

Figure 6:
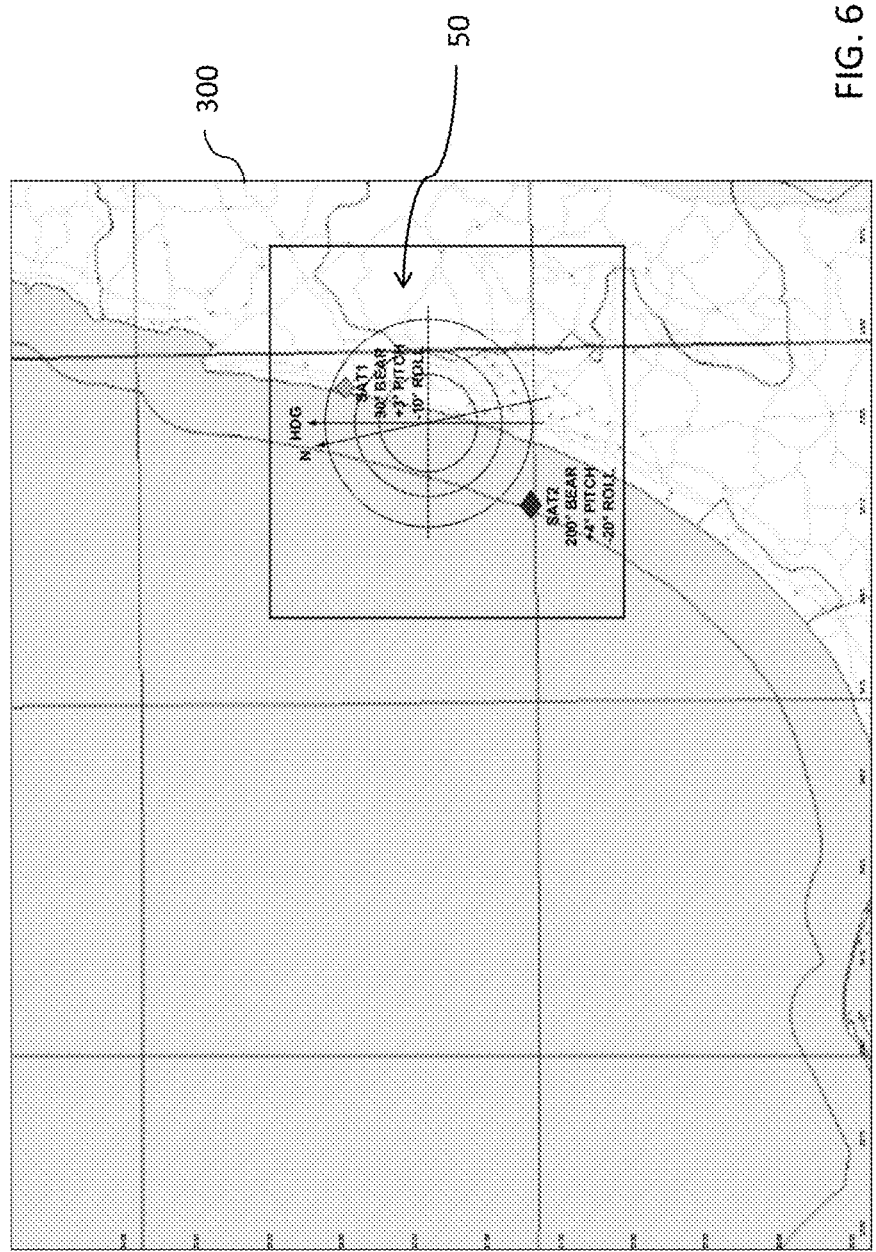
FIG. 6 illustrates another view of a display of a display unit outputting data indicative of maneuvering and recovery ranges according to embodiments of the present disclosure.

FIG. 6 illustrates an embodiment in which the display 50 of the indicators of the maneuvering range and/or recovery range are superimposed on a navigation map 300. This illustrates how the present disclosure may interact for example with navigation systems embedded in a control panel of an aircraft.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A computer implemented method of assisting control of an aircraft for maintaining communication between an antenna mounted on the aircraft and a transceiver, the method comprising:
   obtaining an antenna envelope characterizing directions relative to the aircraft for which a directive gain of the antenna exceeds a predetermined threshold;
   determining a direction of the transceiver relative to the aircraft;
   determining a maneuvering range of the aircraft by comparing the antenna envelope and the transceiver direction, wherein the maneuvering range is indicative of eligible orientations of the aircraft for maintaining the transceiver within the antenna envelope; and
   outputting data indicative of the maneuvering range to at least one of a display unit and an autopilot system of the aircraft, wherein the display unit is arranged in a cabin of the aircraft or in a remote control station, and the outputted data is used to maintain communication between the antenna mounted on the aircraft and the transceiver.

2. The method according to claim 1, wherein when the transceiver direction is out of the antenna envelope, the maneuvering range is empty.

3. The method according to claim 1, wherein the predetermined threshold is variable with respect to a direction relative to the aircraft.

4. The method according to claim 1, wherein the data indicative of the maneuvering range comprises at least one of roll and pitch variation maximum values to maintain the transceiver within the antenna envelope.

5. The method according to claim 4, wherein the at least one of roll and pitch variation maximum values include a tolerance margin.

6. The method according to claim 1, further comprising:
   determining a recovery range of the aircraft, the recovery range defining potential orientations of the aircraft for returning the transceiver within the antenna envelope; and
   outputting data indicative of the recovery range.

7. The method according to claim 6, wherein when the transceiver direction is in the antenna envelope, the recovery range is empty.

8. The method according to claim 6, wherein the data indicative of the recovery range comprises at least one of roll and pitch variation minimum values to return the transceiver within the antenna envelope.

9. The method according to claim 1, wherein obtaining the antenna envelope is performed using data indicative of a reference antenna radiation pattern.

10. The method according to claim 9, wherein the reference antenna radiation pattern involves a scanning capability of at least the antenna and interferences between the antenna and the aircraft structure.

11. The method according to claim 9, wherein obtaining the antenna envelope is performed by accessing prestored data indicative of directions relative to the aircraft for which the reference antenna radiation pattern exceeds a default threshold.

12. The method according to claim 9, wherein obtaining the antenna envelope comprises updating the predetermined threshold and determining the antenna envelope using the updated predetermined threshold and the reference antenna radiation pattern.

13. The method according to claim 9, wherein obtaining the antenna envelope comprises detecting obstruction from a scene relief using topographical data.

14. The method according to claim 6, wherein at least one of the data indicative of the maneuvering range and the data indicative of the recovery range are output to a control system of an unmanned aircraft vehicle, which is remote from the unmanned aircraft vehicle.

15. A non-transitory computer-readable medium containing program instructions executed by a processor, the computer-readable medium comprising:
   program instructions that assist control of an aircraft for maintaining communication between an antenna mounted on the aircraft and a transceiver;
   program instructions that obtain an antenna envelope characterizing directions relative to the aircraft for which a directive gain of the antenna exceeds a predetermined threshold;
   program instructions that determine a direction of the transceiver relative to the aircraft;
   program instructions that determine a maneuvering range of the aircraft by comparing the antenna envelope and the transceiver direction, wherein the maneuvering range is indicative of eligible orientations of the aircraft for maintaining the transceiver within the antenna envelope; and
   program instructions that output data indicative of the maneuvering range to at least one of a display unit and an autopilot system of the aircraft, wherein the display unit is arranged in a cabin of the aircraft or in a remote control station, and the outputted data is used to maintain communication between the antenna mounted on the aircraft and the transceiver.

16. A system for use in assisting control of an aircraft for maintaining communication between an antenna mounted on the aircraft and a transceiver, the system being configured to obtain positional data of the aircraft and the transceiver, the system comprising:
   a memory including instructions for causing a processing unit to:
   obtain an antenna envelope characterizing directions relative to the aircraft for which the directive gain of the antenna exceeds a predetermined threshold;
   determine a direction of the transceiver relative to the aircraft;
   determine a maneuvering range of the aircraft by comparing the antenna envelope and the transceiver direction, wherein the maneuvering range is indicative of eligible orientations of the aircraft maintaining the transceiver within the antenna envelope; and
   output data indicative of the maneuvering range to at least one of a display unit and an autopilot system of the aircraft, wherein the display unit is arranged in a cabin of the aircraft or in a remote control station, and the outputted data is used to maintain communication between the antenna mounted on the aircraft and the transceiver.

17. The system according to claim 16, wherein the memory further includes instructions for causing the processing unit to:
 determine a recovery range of the aircraft, the recovery range defining potential orientations of the aircraft for returning the transceiver within the antenna envelope; and
 output data indicative of the recovery range.

18. The system of claim 16, further comprising:
 an output unit configured to output the data indicative of the maneuvering range to a control station of an unmanned aircraft vehicle, which is remote from the unmanned aircraft vehicle.

19. A computer implemented method of assisting control of an aircraft for maintaining communication between an antenna mounted on the aircraft and a transceiver, the method comprising:
 obtaining an antenna envelope defining directions relative to the aircraft for which the directive gain of the antenna exceeds a predetermined threshold;
 determining a direction of the transceiver relative to the aircraft;
 determining a recovery range of the aircraft by comparing the antenna envelope and the transceiver direction, the recovery range defining eligible orientations of the aircraft for returning the transceiver within the antenna envelope; and
 outputting data indicative of the recovery range to at least one of a display unit and an autopilot system of the aircraft, wherein the display unit is arranged in a cabin of the aircraft or in a remote control station, and the outputted data is used to maintain communication between the antenna mounted on the aircraft and the transceiver.

20. A system for use in assisting control of an aircraft for maintaining communication between an antenna mounted on the aircraft and a transceiver, the system being configured to obtain positional data of the aircraft and the transceiver, the system comprising:
 a memory including instructions for causing a processing unit to:
 obtain an antenna envelope characterizing directions relative to the aircraft for which the directive gain of the antenna exceeds a predetermined threshold;
 determine a direction of the transceiver relative to the aircraft;
 determine a recovery range of the aircraft by comparing the antenna envelope and the transceiver direction, the recovery range being indicative of eligible orientations of the aircraft for returning the transceiver within the antenna envelope; and
 output data indicative of the recovery range to at least one of a display unit and an autopilot system of the aircraft, wherein the display unit is arranged in a cabin of the aircraft or in a remote control station, and the outputted data is used to maintain communication between the antenna mounted on the aircraft and the transceiver.

* * * * *